(12) United States Patent
Shin (10) Patent No.: US 7,869,323 B2
(45) Date of Patent: Jan. 11, 2011

(54) OPTICAL DISC MEDIA TYPE CONFIRMATION METHOD

(75) Inventor: Yun-Sup Shin, Seongnam Si (KR)

(73) Assignee: LG Electronics Inc., Seoul (KR)

( * ) Notice: Subject to any disclaimer, the term of this patent is extended or adjusted under 35 U.S.C. 154(b) by 130 days.

(21) Appl. No.: 11/921,009

(22) PCT Filed: Jun. 26, 2006

(86) PCT No.: PCT/KR2006/002469

§ 371 (c)(1),
(2), (4) Date: Sep. 19, 2008

(87) PCT Pub. No.: WO2006/137721

PCT Pub. Date: Dec. 28, 2006

(65) Prior Publication Data

US 2009/0073838 A1    Mar. 19, 2009

(30) Foreign Application Priority Data

Jun. 24, 2005    (KR) ..................... 10-2005-0055171

(51) Int. Cl.
*G11B 7/00* (2006.01)
(52) U.S. Cl. .................................. 369/53.22
(58) Field of Classification Search ............. 369/53.22, 369/94, 44.37, 112.23, 53.1
See application file for complete search history.

(56) References Cited

U.S. PATENT DOCUMENTS

| | | | |
|---|---|---|---|
| 4,980,877 A | 12/1990 | Sugiyama et al. | |
| 5,666,345 A | 9/1997 | Takahashi et al. | |
| 5,859,822 A * | 1/1999 | Inoue et al. | 369/53.22 |
| 6,021,012 A * | 2/2000 | Bang | 360/51 |
| 6,469,965 B1 | 10/2002 | Horita | |
| 6,507,540 B1 | 1/2003 | Berg et al. | |
| 6,628,593 B1 * | 9/2003 | Yamashita et al. | 369/53.22 |
| 6,798,734 B1 | 9/2004 | Kawasaki et al. | |
| 6,891,784 B2 | 5/2005 | Yanagawa et al. | |
| 6,975,574 B2 | 12/2005 | Yanagawa et al. | |
| 7,477,583 B2 * | 1/2009 | Kondo | 369/53.22 |
| 2002/0054561 A1 | 5/2002 | Inase et al. | |
| 2003/0218946 A1 | 11/2003 | Huang et al. | |
| 2004/0145990 A1 | 7/2004 | Chang et al. | |
| 2005/0174916 A1 | 8/2005 | Yamanaka | |

FOREIGN PATENT DOCUMENTS

| | | |
|---|---|---|
| CN | 1151578 | 6/1997 |
| JP | 1993-347043 | 12/1993 |
| JP | 08-115577 | 5/1996 |

(Continued)

*Primary Examiner*—Nabil Z Hindi
(74) *Attorney, Agent, or Firm*—Harness, Dickey & Pierce, P.L.C.

(57) ABSTRACT

The present invention relates to a method for preventing a problem of collision between an optical system and a media by suggesting a method for confirming the kind of the medium prior to its operation in a drive having a compatibility with respect to a method for storing a near field optical information using SIL and a method for storing a remote field optical information below the existing blu-ray disk. The present invention can distinguish from an inserted optical disk if a compatible drive/pickup is in a near-field method, and confirm if the inserted optical disk is operable in a near-field method drive/pickup in advance, also.

14 Claims, 7 Drawing Sheets

FOREIGN PATENT DOCUMENTS

| | | |
|---|---|---|
| JP | 1997-251661 | 9/1997 |
| JP | 1999-306650 | 11/1999 |
| JP | 2000-123375 | 4/2000 |
| JP | 2002-157768 | 5/2002 |
| JP | 2004-030821 | 1/2004 |
| JP | 2004-335064 | 11/2004 |
| JP | 2005-093013 | 4/2005 |
| JP | 2005-151708 | 6/2005 |
| KR | 1020000061708 | 10/2000 |
| KR | 1020010076785 | 8/2001 |

* cited by examiner

OPTICAL DISC MEDIA TYPE CONFIRMATION METHOD

BACKGROUND OF THE INVENTION

1. Field of the Invention

The present invention relates to a method for preventing a problem of collision between an optical system and the medium by suggesting a method for confirming the kind of the medium prior to its operation in a drive having a compatibility with respect to a method for storing a near field optical information using SIL and a method for storing a remote field optical information below the existing blu-ray disk.

2. Background Art

In accordance with the developments of various technologies in a field of optical storing equipments, the various optical storing equipments have been developed. The currently developed optical storing equipments are largely divided into those using a remote field method and the others using a near field method. Generally, one optical storing equipment supports one of the two methods. Recently, an optical storing equipment having a compatibility with the two methods was presented. The features of the optical storing equipments of a near-field method and a remote-field method will now be described.

Figure 1:
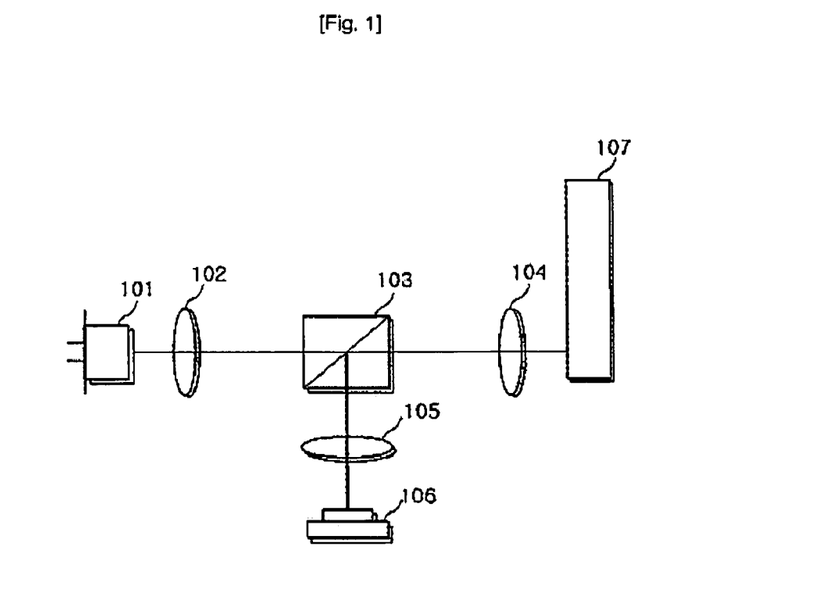
FIG. 1 is a block diagram of the structure of an optical pickup unit in a remote-field method.

FIG. 1 is a block diagram showing an optical pickup unit of the configuration of an optical storing equipment using a remote field method. The optical pickup unit includes a laser diode (101), a collimator lens (102), an optical separator (103), an objective lens (104), a cylindrical lens (105) and a photodiode (106).

FIG. 1 shows the configuration of the first generational optical pickup for a DVD, of which a light pathway is divided into a light transmitter before a light generated from the laser diode (101) is transmitted to the objective lens (104) and a light receiver of the photodiode (106) where a light condensed by the objective lens (104) is reflected in a disk and detects an optical signal.

The principle of the light transmitter is as follows. In general, the light generated from the laser diode (101) is emitted with an intensity distribution in an ellipse. As the objective lens (104) has a plane of incidence in a circle, the intensity distribution of the emitted light should be changed to be in a circle using a beam shaping prism in order to effectively condense a light to the objective lens (104).

As the light output from the laser diode (101) becomes a linear polarized light, an optical separator (103) is used in order to minimize the loss of light. The optical separator (103) is not a function required in the transmitter but used to detect a light reflected back from the disk. The laser diode (101) is applied so that the direction of its linear polarized light is parallel with a bottom face and the light is transmitted to the optical separator (103), the light polarized in the horizontal direction can have a transmittance with more than 97%.

If the transmitted light passes through a a./4 wavelength plate (not shown), a linear polarized light is changed into a circular polarized light by the wavelength plate and reflected by a reflection mirror for decreasing the height of a pickup and inputted to the objective lens (104).

The light input to the objective lens (104) is reflected by the disk (107) and the light beam reflected by the disk (107) is transmitted through the objective lens (104). The light reflected by the reflection layer of the disk (107) (with a high refraction rate in the air) has a low refraction rate, and a phase is changed by 180° in a frequency of a light. In this case, if a light polarized in a circle by the λ/4 wavelength plate is transmitted through the λ/4 wavelength plate again, it is changed into a linear polarized light which is perpendicular to the original polarized direction. In accordance with the characteristics of a polarized light separator (103), a light is effectively detected in the photodiode (106). In other words, a horizontally polarized light is mostly transmitted, but a vertically polarized light is mostly reflected.

In the development of current optical storing technology, CD, DVD and BD have been sequentially developed that, among other things, increase recording volume. A principle used to increase recording volume is to shorten a wavelength of a laser light or to increase a numerical aperture (N/A) of an objective lens. In a blue-ray disk, the method to shorten a wavelength is determined to reach a limit. The numerical aperture (N/A) of the objective lens is determined to be difficult to develop by the existing remote-field method more.

Recently, a near-field recording method using the newly developed SIL (solid immersion lens) may provide a technology for dramatically increasing recording volume. In the method, a hemispherical SIL made of a medium of which the refraction rate is considerably greater than 1 is disposed under an objective lens so that a substantial numerical aperture (n*NA) is greater than 1.

Figure 2:
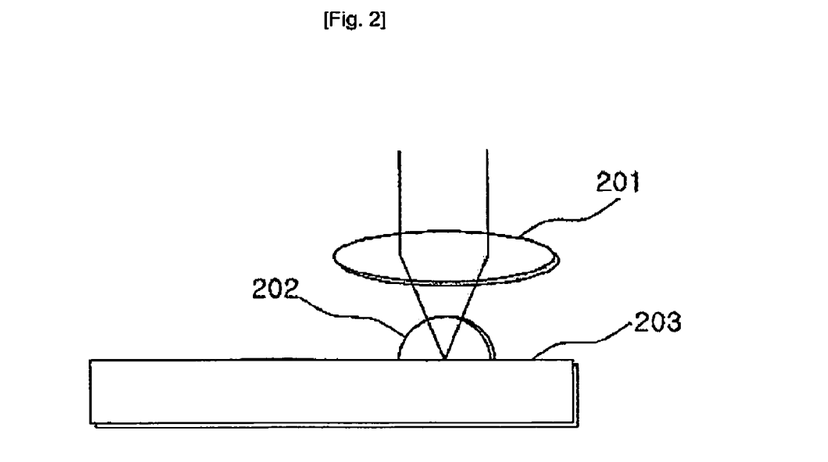
FIG. 2 is a block diagram of the structure of an optical pickup unit in a near-field method.

FIG. 2 is a cross-sectional view of an optical pickup unit of an optical storing device supporting a near-field method. In a device using a near-field method, the optical pickup includes a solid immersion lens (SIL) (202) contrary to an optical storing device using a remote-field method. The principle of an optical pickup using a near-field method having a solid immersion lens (SIL) (202) is as follows.

Referring to FIG. 2, if a laser is condensed to the solid immersion lens (SIL) (202) by the objective lens (201), the light is focused on the bottom surface of the solid immersion lens (SIL) (202) with a high refraction rate. A focused spot mirror is decreased in inverse proportion to the refraction rate of the solid immersion lens (SIL) (202) to obtain a spot less than a diffraction limit.

The spot is transmitted to a medium in the form of an evanescent light to heat a surface that stores a bit information by a method such that the area is magnetized in a specific direction by the heated domain layer magnetizing coil. In the method, a position in a horizontal direction is automatically controlled in a probe method by a floating head allowing for the recording and reproducing of information at high speed.

In general, an optical system consists of two lens. A free focus lens is loaded on a front surface of a floating head, corresponding to an objective lens (102) in a conventional optical magnetic disk device, and a hemisphere or a supersphere lens such as the solid immersion lens (SIL) (202). The solid immersion lens (SIL) (202) is made of a material with a high absolute refraction rate (n) like a glass to be mounted on a lower surface of a floating head. The recording reproduction system mainly uses an optical magnetic recording of a magnetic demodulation type such as a mini disk. In this method, a temperature of the recording layer in a beam spot is temporarily increased by an irradiation of the laser beam to record using a magnetic force limited to a coil above the Curie temperature where magnetization is easily lost.

What is to be considered important in developing a new type of optical storing device is a compatibility with existing methods. Users sometimes avoid using a new method which is not compatible with existing methods, and it is difficult to enter the current market. Accordingly, the problem to be considered is if the media used may be used in both newly developed and existing drives. Especially, since the distance between the bottom surface of a solid immersion lens (SIL) and a surface of the medium of an optical system used in a near-field method is merely tens of nm, if users do not have a way to see the currently inserted media exactly an optical system or a media may be damaged by collisions during between the drives and medium.

In order to avoid this situation, a new process is required for quickly identifying a media prior to operation of a compatible drive.

SUMMARY OF THE INVENTION

The present invention is provided in order to solve the above problem with an object to provide a method to prevent the problems of a collision between an optical system and a media by suggesting a method to determine the kinds of inserted media prior to the operation in a compatible drive with respect to a near-field optical information storing method using a solid immersion lens (SIL) and a remote-field optical information storing method.

A method for confirming a recording media provided in accordance with the present invention so as to achieve the above object includes: detecting a predetermined discriminating signal with at least one optical pickup of at least two optical pickups; determining if the predetermined recording media discriminating signal is redetected depending on if the discriminating signal is detected; and starting a recording/reproduction of data onto a recording media using the corresponding optical pickup if the predetermined recording media discriminating signal is detected.

It is preferable that the method for detecting a predetermined discriminating signal with at least one optical pickup be characterized in that the currently inserted optical pickup is determined and a predetermined discriminating signal is detected in accordance with the corresponding optical pickup in the currently mounted recording medium.

It is preferable that the current optical pickup be changed into another optical pickup and a predetermined recording medium discriminating signal be redetected, if the predetermined discriminating signal is not detected.

Preferably, if the data recording/reproduction is impossible, the current optical pickup is changed into another optical pickup and a predetermined recording medium discriminating signal is redetected and recording/reproducing data on a recording medium is started using the corresponding optical pickup.

Preferably, if the recording medium discriminating signal is not redetected for the predetermined numbers even if the current optical pickup was changed into another optical pickup, the corresponding recording medium is released from a tray.

It is preferable that the currently inserted recording medium discriminating signal is detected using a signal reproducing a free-pit at the header portion of the recording medium in case that the current optical pickup is a remote field method.

It is preferable that the currently inserted recording medium discriminating signal is detected using a push-pull signal in case that the current optical pickup is a near-field method.

It is preferable that the currently inserted recording medium discriminating signal is detected using a signal reproducing a free-pit at the header portion of the recording medium in case that the current optical pickup is a near-field method.

It is preferable that the method for discriminating if the current optical pickup is a near-field method is to depend on if a solid immersion lens is located in the optical pickup.

A method for confirming a recording media in accordance with the present invention comprises: determining if a solid immersion lens (SIL) is placed on an optical pickup; detecting a predetermined discriminating signal on a recording medium depending on if the solid immersion lens is placed; determining if the predetermined recording media discriminating signal is redetected depending on if the discriminating signal is detected; and starting a recording/reproduction of data onto a recording media using the corresponding optical pickup if the predetermined recording media discriminating signal is detected.

As described above, the present invention can distinguish an inserted optical disk if a compatible drive/pickup is a near-field method, and confirm if the inserted optical disk is operable in a near-field method drive/pickup in advance.

In addition, the present invention can distinguish from an inserted optical disk even if a compatible drive/pickup is a remote-field method below the existing blue-ray disk. The optical disk is automatically and quickly confirmed prior to the operation in a compatible drive/pickup using the above methods to set a process to enter into the substantial operations (reproduction/recording).

Moreover, the present invention provides that each method optical disk may be used stably without danger from a collision in a drive/pickup compatible with a near-field method and a remote-field method.

DETAILED DESCRIPTION OF THE PREFERRED EMBODIMENTS

Hereinafter, embodiments of the present invention will be described in detail with reference to the attached drawings. Reference now should be made to the drawings; in which the same reference numerals are used throughout the different drawings to designate the same or similar components in the following description of the present invention, detailed descriptions may be omitted if it is determined that the detailed descriptions of related well-known functions and constructions may make the gist of the invention unclear.

Figure 3:
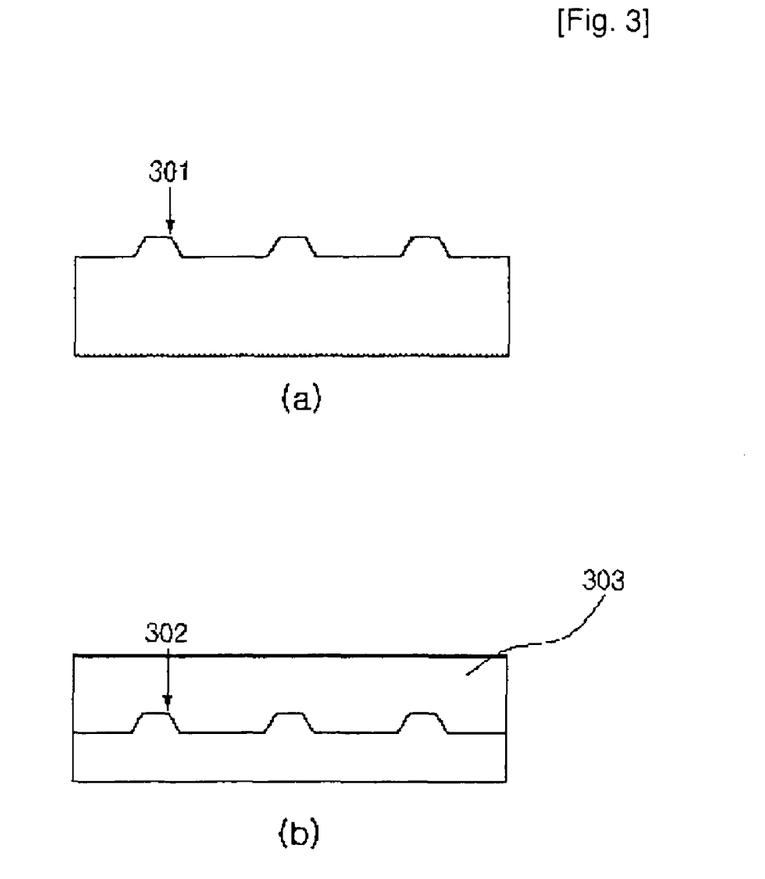
FIG. 3A is a cross-sectional view of the structure of an optical pickup unit in a near-field method.
FIG. 3B is a cross-sectional view of the structure of an optical pickup unit in a remote-field method.

The optical disks applied to a near-field method and a remote-field method have features shown in FIGS. 3A and 3B. The near-field method optical disk, as shown in FIG. 3A, has a structure of pit (ROM) or groove (-R, RW) (301) on a surface whereas the remote-field method optical disk, as shown in FIG. 3B, has a pit/groove structure (302) in the middle layer of the medium and a cover layer (303) with a certain thickness. Accordingly, when a near-field pickup unit approaches a remote-field optical disk, it collides with an optical disk before contacting the structure for reproduction. When a remote-field pickup unit meets a near-field optical disk, it is impossible to obtain a desired signal due to a spherical aberration even if a reproduction is possible.

Accordingly, it is important to position an exact optical pickup in accordance with the optical disk being used. A method for recognizing an optical disk in an optical disk device supporting a remote-field method and an optical disk supporting a near-field method now will be described.

Figure 4:
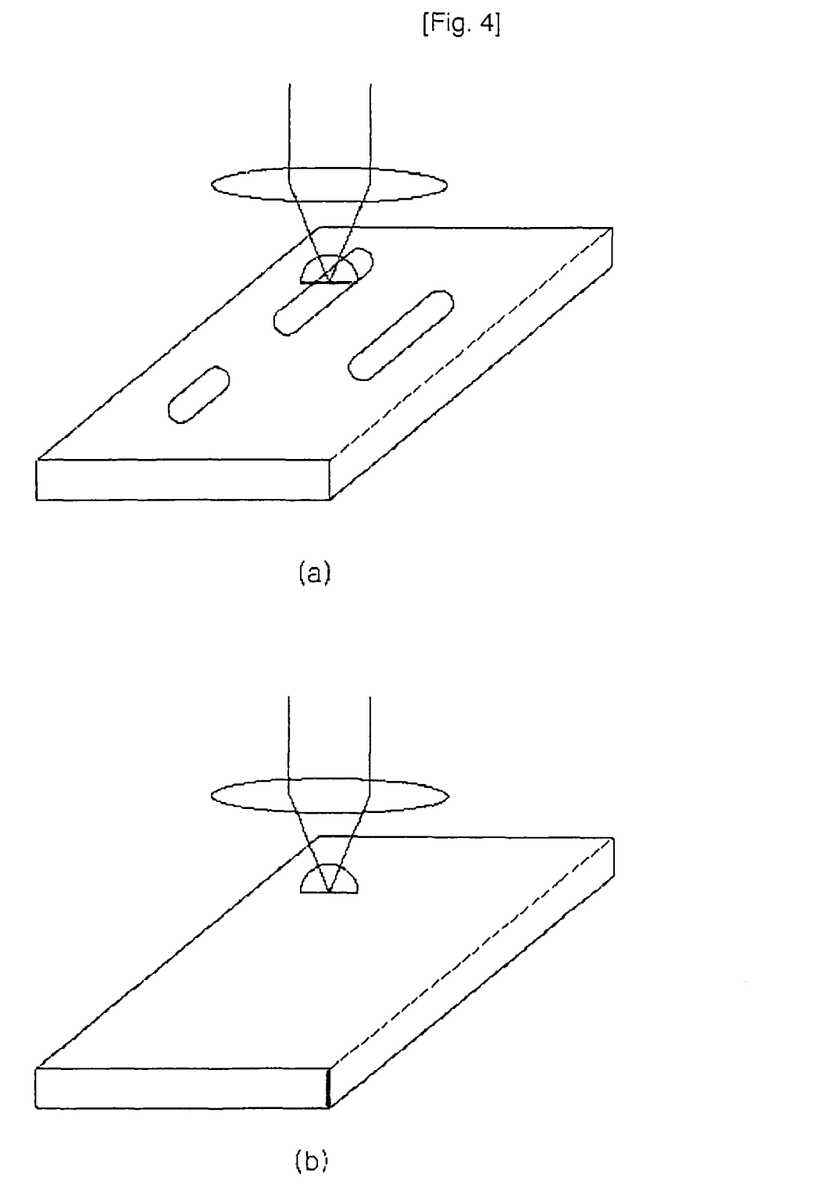
FIG. 4A shows a method for reproducing a near-field surface recording optical disk in a near-field optical system where an objective lens is connected with a solid immersion lens (SIL).
FIG. 4B shows a method for reproducing a remote-field surface recording optical disk in a near-field optical system where an objective lens is connected with a solid immersion lens (SIL).

FIGS. 4A and 4B show methods for reproducing a near-field surface recording optical disk and a remote-field surface recording optical disk in a near-field optical system combined with an objective lens and the solid immersion lens (SIL).

Referring to FIGS. 4A and 4B, in case, that a pickup unit is a near-field method, the pickup unit scans the surface of an optical disk in a track vertical direction to confirm if a pickup push-pull signal (a difference signal of left-right photodiode) is generated so as to confirm an optical disk. A near-field method optical disk has a pit/groove structure on the surface, therefore it generates a push-pull signal with respect to a track traversing scanning as shown in FIG. 4A, whereas a remote-field method optical disk has a flat surface due to a cover layer, therefore no signal is obtained in a photodiode differential signal circuit as shown in FIG. 4B.

Figure 5:
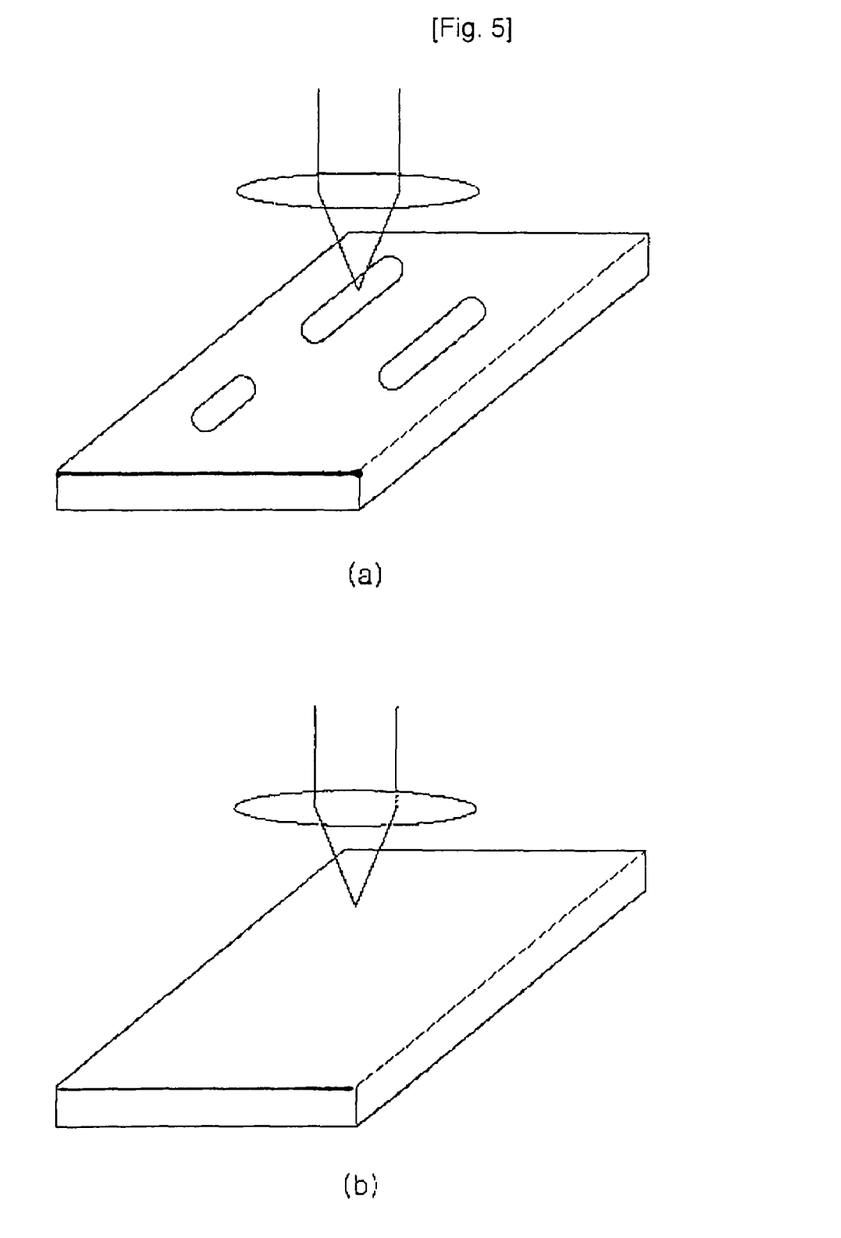
FIG. 5A shows a method for reproducing a near-field surface recording optical disk in the remote-field optical system.
FIG. 5B shows a method for reproducing a remote-field surface recording optical disk in the remote-field optical system.

FIG. 5A shows a method for reproducing a near-field surface recording optical disk in a remote-field optical system and FIG. 5B shows a method for reproducing a remote-field surface recording optical disk in a remote-field optical system.

If the pickup unit has a remote-field method, a free-pit portion where an optical disk information is stored in a header of an optical disk is reproduced. However, in a near-field optical disk, even if it has a free pit, has the ½~¼ of the length used in a remote field optical disk to exceed a resolving power below the limit of a diffraction to the remote-field pickup unit and a state-of-the-art spherical aberration due to the absence of a cover layer, therefore it is impossible to reproduce an information. In case of a remote-field optical disk, a free-pit is reproduced to obtain the information of an optical disk.

Figure 6:
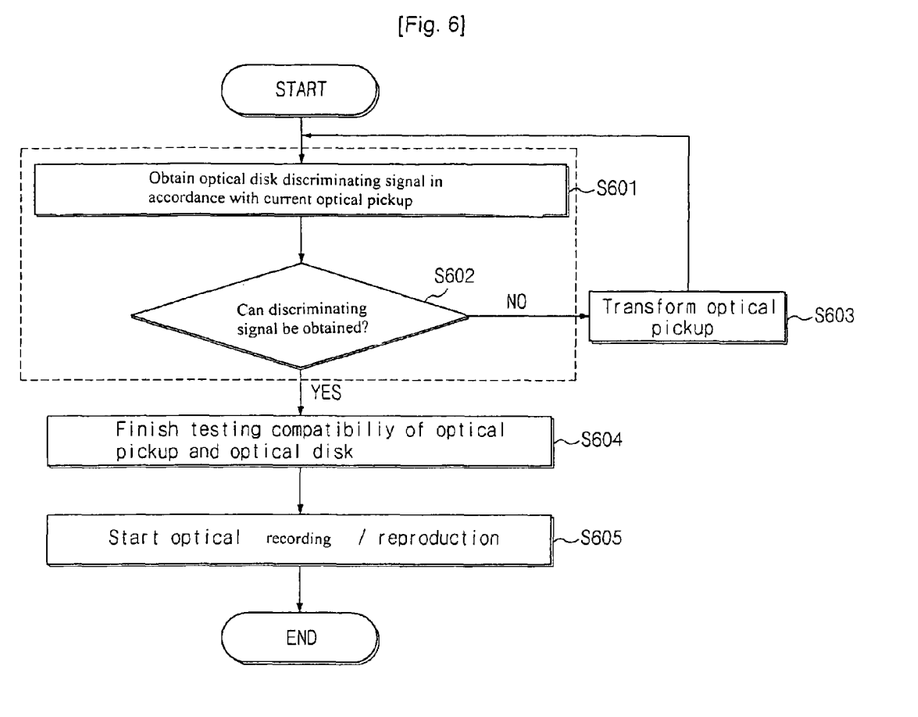
FIG. 6 is a flow chart showing a method for controlling an optical pickup depending on the currently inserted optical disk in accordance with an embodiment of the present invention.

FIG. 6 is a flow chart showing a method for confirming an optical disk medium in a compatible optical disk drive with a near-field method and a remote field method in accordance with an embodiment of the present invention. Referring to FIG. 6, a process for confirming an optical disk prior to an operation of the compatible pickup unit and drive is as follows.

The step S601 shows a process for detecting a discriminating signal in accordance with the current optical pickup and the step S602 shows a process for determining if the discriminating signal is detected and finishing the test or shifting the current optical pickup in accordance with a result. In accordance with the present invention, the steps S601 and S602 can be realized in two methods and the detailed contents are shown in FIGS. 7A to 8.

Figure 7:
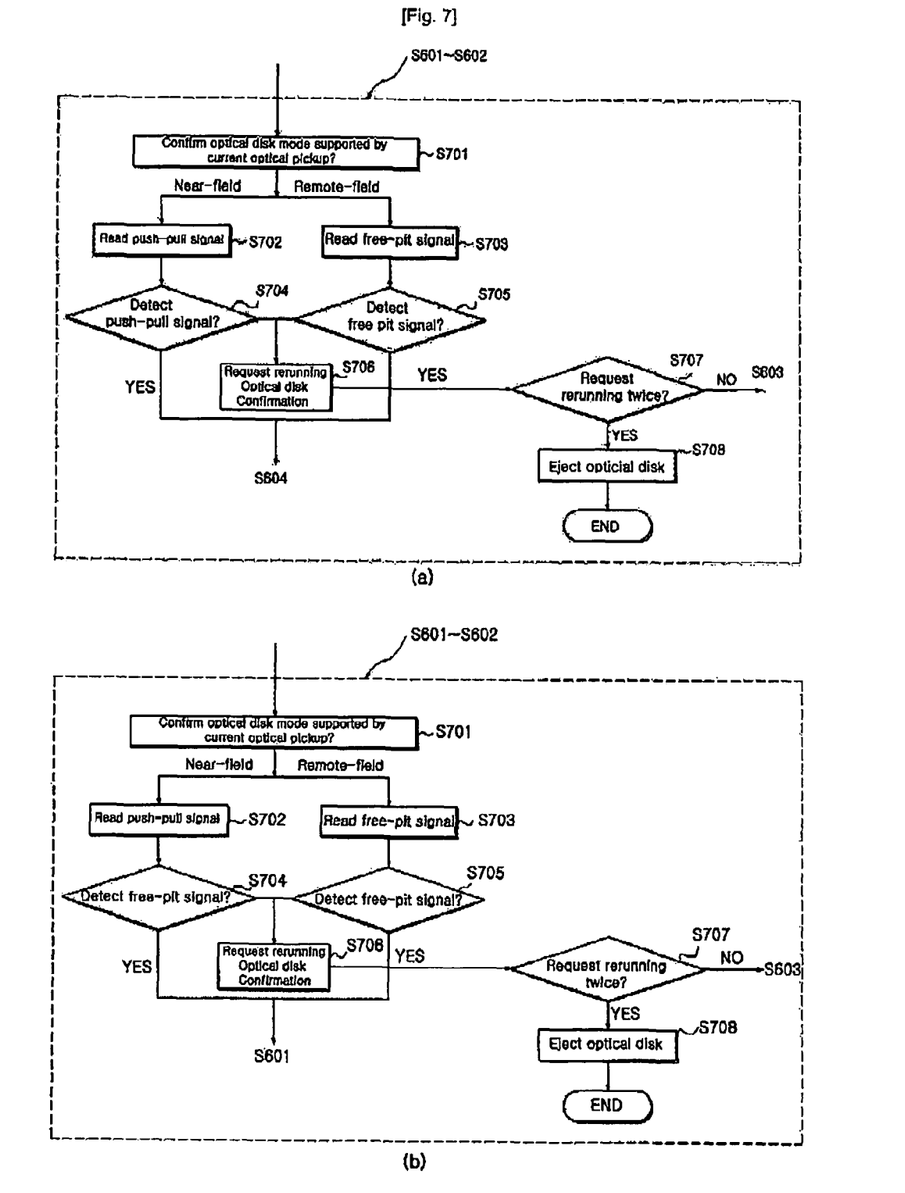
FIG. 7 is a detailed flow chart of the steps S601 to S602 in FIG. 6 in accordance with an embodiment of the present invention.
Figure 8:
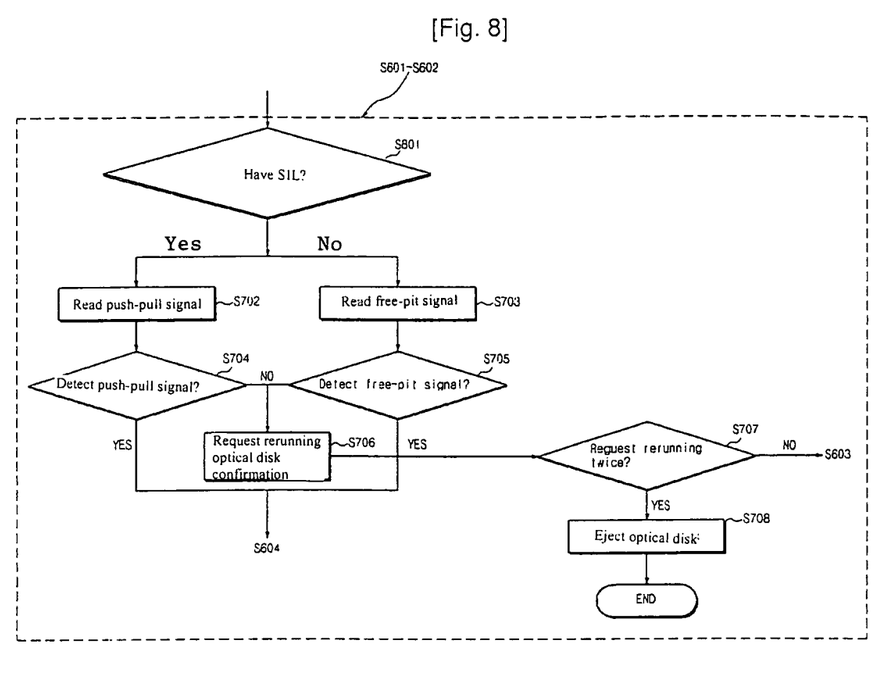
FIG. 8 is a detailed flow chart of the steps S601 to S602 in FIG. 6 in accordance with another embodiment of the present invention.

Referring to FIG. 7A, step S701 confirms an optical disk mode supported by the current optical pickup. (S701) The optical pickup set in the current optical disk is divided into a remote-field method and a near-field method and a predetermined signal is read in order that a corresponding optical pickup brings a discriminating signal from the optical disk.

The step S702 is a process for reading a push-pull signal where a push-pull signal is read from a corresponding optical disk when the optical pickup is set as a near-field optical pickup. If the optical pickup is set as a remote-field, a free-pit signal is read. (S703)

The steps S704 and S705 show a process for searching if a predetermined signal is detected. If the predetermined discriminating signal is not detected, a rerunning for confirming an optical disk is requested (S706) and step S603 is performed.

If a rerunning for confirming the optical disk is requested, it is determined if the number of requests for rerunning is two. (S707) When the number of requests for rerunning the optical disk, is greater than two, the current optical disk is ejected from a tray because the currently inserted optical disk is not read. (S708) In an embodiment of the present invention, the number is limited to two, but may be set to greater than two in consideration of the number of errors in a disk recognition.

FIG. 7B shows a similar process to FIG. 7A except a process (S710) for detecting a free-pit signal in an optical disk header if the corresponding optical pickup is set as a near-field method.

FIG. 8 shows another embodiment of the steps 601 and 602 for confirming which of a near-field or a remote-field method is applied. In order to confirm the methods of a pickup unit, it is confirmed if a solid immersion lens (SIL) is on an optical axis. (S801) For example, when the solid immersion lens (SIL) is mechanically shifted, a pickup unit mode is remembered in accordance with the positions and a pickup unit method is confirmed in accordance with the mode.

If the pickup unit mode is confirmed, an optical disk is distinguished by an optical disk discrimination method in accordance with each pickup unit mode. In a near-field pickup unit, a free pit is reproduced in each optical disk to be used as a method for distinguishing an optical disk in accordance with the security of a signal. (S702 and S703)

If an Optical Disk Method is Confirmed by the Above Method and the Current pickup unit is identical to the optical disk method, a division process is finished and the operations of a reproduction/recording are continued. If a pickup unit is different from the optical disk method, a formality mode of the pickup unit is changed (for example, a near-field pickup unit with a solid immersion lens (SIL)=> a remote-field pickup unit without a solid immersion lens (SIL)) and a process for confirming a method of an optical disk is reiterated so that a pickup unit is identical to an optical disk.

In the present embodiment, if a rerunning for confirming the optical disk is requested, it is determined if the number of requests is two. (S707) In case that the number of requests is greater than two, the current optical disk is ejected from a tray because the currently inserted optical disk is not read. (S708) In the present embodiment, the number is limited to two, but may be set to greater than two in consideration of the number of errors in a disk recognition.

If the steps of S601 and S602 are performed by the above methods, the steps of S603 or S604 is completed.

In other words, as described above, if the corresponding discriminating signal is detected and a signal is recognized, the test for compatibility of an optical pickup and an optical disk is finished (S604) and an operation of recording and reproducing is started. (S605) However, if a header information can not be recognized, an optical pickup is shifted (S603) and the steps S601 and S602 are reiterated.

As this process is established, the newly developed near-field method pickup unit and an optical disk is compatible with the existing remote-field method pickup unit and an optical disk without a possible collision, resulting in forming a new market.

The foregoing preferred embodiments are merely exemplary and are not to be construed as limiting the present invention. Many alternatives, modifications and variations will be apparent to those skilled in the art within the scope and spirit of the invention described in the claims.

The invention claimed is:

1. A method for confirming a recording media comprising:
   detecting a predetermined discriminating signal with at least one optical pickup of at least two optical pickups;
   determining if the predetermined recording media discriminating signal is redetected depending on if the discriminating signal is detected; and
   starting a recording/reproduction of data onto recording media using the corresponding optical pickup if the predetermined recording media discriminating signal is detected, wherein the current optical pickup is changed and if the predetermined discriminating signal is not detected, redetecting the predetermined recording medium discriminating signal, and
   wherein if the recording medium discriminating signal is not detected in a predetermined number of attempts, even if the current optical pickup is changed to the other optical pickup of the at least two optical pickups, the corresponding recording medium is ejected.

2. The method of claim 1, wherein the method for detecting a-predetermined discriminating signal with at least one optical pickup is characterized in that the currently located optical pickup is determined and a predetermined discriminating signal is detected in accordance with the corresponding optical pickup in the currently mounted recording medium.

3. The method of claim 1, wherein if the data recording/reproduction is impossible, the current optical pickup is changed into another optical pickup and a predetermined recording medium discriminating signal is redetected and recording/reproducing data on a recording medium is started using the corresponding optical pickup.

4. The method of claim 1, wherein the currently inserted recording medium discriminating signal is detected using a signal reproducing a free-pit at the header portion of the recording medium in case that the current optical pickup is a remote field method.

5. The method of claim 1, wherein the currently inserted recording medium discriminating signal is detected using a push-pull signal in case that the current optical pickup is a near-field method.

6. The method of claim 1, the currently inserted recording medium discriminating signal is detected using a signal reproducing a free-pit at the header portion of the recording medium in case that the current optical pickup is a near-field method.

7. The method of claim 1, wherein the method for discriminating if the current optical pickup is a near-field method is to depend on if a solid immersion lens is located in the optical pickup.

8. A method for confirming a recording media comprising:
   determining if a solid immersion lens (SIL) is placed on an optical pickup;
   detecting a predetermined discriminating signal on a recording medium depending on if the solid immersion lens is placed;
   determining if the predetermined recording media discriminating signal is redetected depending on if the discriminating signal is detected; and
   starting a recording/reproduction of data onto a recording media using the corresponding optical pickup if the predetermined recording media discriminating signal is detected,
   wherein the currently inserted recording medium discriminating signal is detected using a signal reproducing a free-pit at the header portion of the recording medium when a solid immersion lens (SIL) is not used with the current optical pickup, and
   wherein the currently inserted recording medium discriminating signal is detected using a push-pull signal when a solid immersion lens (SIL) is used with the current optical pick-up.

9. The method of claim 8, wherein the method for detecting a predetermined discriminating signal with at least one optical pickup is characterized in that the currently located optical pickup is determined and a predetermined discriminating signal is detected in accordance with the corresponding optical pickup in the currently mounted recording medium.

10. The method of claim 8, wherein the current optical pickup is changed into another optical pickup and a predetermined recording medium discriminating signal is redetected, if the predetermined discriminating signal is not detected.

11. The method of claim 8, wherein if the data recording/reproduction is impossible, the current optical pickup is changed into another optical pickup and a predetermined recording medium discriminating signal is redetected and recording/reproducing data on a recording medium is started using the corresponding optical pickup.

12. The method of claim 10, wherein if the recording medium discriminating signal is not redetected for the predetermined numbers even if the current optical pickup was changed into another optical pickup, the corresponding recording medium is released from a tray.

13. The method of claim 8, wherein the method for transforming into another optical pickup is performed by switching a solid immersion lens.

14. The method of claim 8, wherein the optical pickup includes a compatible optical pickup of a remote-field method and a near-field method.

* * * * *